(12) United States Patent
Yang et al.

(10) Patent No.: US 9,071,142 B2
(45) Date of Patent: Jun. 30, 2015

(54) MULTI-PHASE SMPS WITH LOAD TRANSIENT CONTROL AND ASSOCIATED CONTROL METHOD

(75) Inventors: Eric Yang, Saratoga, CA (US); Lijie Jiang, Hangzhou (CN); Qian Ouyang, Hangzhou (CN); Xiaokang Wu, Hangzhou (CN); Bo Zhang, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 344 days.

(21) Appl. No.: 13/530,290

(22) Filed: Jun. 22, 2012

(65) Prior Publication Data

US 2013/0342176 A1 Dec. 26, 2013

(51) Int. Cl.
*G05F 1/563* (2006.01)
*H02M 3/158* (2006.01)
*H02M 3/156* (2006.01)

(52) U.S. Cl.
CPC .... *H02M 3/1584* (2013.01); *H02M 2003/1566* (2013.01)

(58) Field of Classification Search
USPC ......... 323/217, 234, 237, 238, 241, 259, 266, 323/268, 282–286, 288, 349–351, 319
See application file for complete search history.

(56) References Cited

U.S. PATENT DOCUMENTS

| | | | | |
|---|---|---|---|---|
| 6,404,175 B1 * | 6/2002 | Yang et al. | ..................... | 323/282 |
| 6,836,103 B2 * | 12/2004 | Brooks et al. | ................. | 323/282 |
| 7,688,048 B2 * | 3/2010 | Nielsen | ......................... | 323/268 |
| 7,852,053 B2 * | 12/2010 | Martin et al. | .................. | 323/272 |
| 7,919,955 B2 * | 4/2011 | Tang et al. | ..................... | 323/272 |
| 8,063,570 B2 * | 11/2011 | Zhang et al. | .................... | 315/224 |
| 2002/0017897 A1 * | 2/2002 | Wilcox et al. | ................. | 323/282 |
| 2008/0001587 A1 * | 1/2008 | Cremoux | ....................... | 323/282 |
| 2009/0072800 A1 * | 3/2009 | Ramadass et al. | ............. | 323/271 |
| 2009/0121695 A1 * | 5/2009 | Pierson et al. | ................. | 323/283 |
| 2010/0134080 A1 | 6/2010 | Ouyang | | |
| 2010/0181983 A1 | 7/2010 | Ouyang | | |
| 2011/0025284 A1 | 2/2011 | Xu et al. | | |
| 2011/0115453 A1 * | 5/2011 | Marsili et al. | .................. | 323/282 |
| 2011/0133711 A1 * | 6/2011 | Murakami et al. | ............. | 323/282 |
| 2011/0188218 A1 | 8/2011 | Hsing et al. | | |
| 2012/0043818 A1 * | 2/2012 | Stratakos et al. | ............... | 307/77 |
| 2012/0049821 A1 * | 3/2012 | Hashiguchi et al. | .......... | 323/282 |
| 2012/0274293 A1 * | 11/2012 | Ren et al. | ....................... | 323/271 |

OTHER PUBLICATIONS

U.S. Appl. No. 13/324,504, Li et al.
U.S. Appl. No. 13/051,360, Dong et al.

* cited by examiner

*Primary Examiner* — Adolf Berhane
*Assistant Examiner* — Nusrat Quddus
(74) *Attorney, Agent, or Firm* — Perkins Coie LLP

(57) ABSTRACT

The present invention discloses a multi-phase switch-mode power supply (SMPS). The multi-phase SMPS may comprise a plurality of comparing circuits and a controller. Wherein each comparing circuit comprises a first input coupled to a threshold voltage, a second input coupled to a feedback signal of the output voltage, and an output configured to provide a load indication signal. The controller may have a plurality of inputs coupled to the outputs of the comparing circuit, and a plurality of outputs configured to provide control signals for driving a plurality of switches of the multi-phase SMPS. And the controller is configured to selectively turn on a plurality of the switches according to the load indication signals.

19 Claims, 12 Drawing Sheets

| Load indication signal | Index |
|---|---|
| LIS1 | 1 |
| LIS2 | 2 |
| LIS3 | 4 |
| LIS4 | 6 |
| LIS5 | 8 |
| LIS6 | 10 |

*FIG. 7A*

| Load indication signal | Index |
|---|---|
| LIS1 | 1 |
| LIS2 | 2 |
| LIS3 | 4 |
| LIS4 | 6 |
| LIS5 | 7 |
| LIS6 | 8 |

*FIG. 7B*

| Load indication signal | Index |
|---|---|
| LIS1 | 1 |
| LIS2 | 2 |
| LIS3 | 5 |
| LIS4 | 10 |

*FIG. 7C*

MULTI-PHASE SMPS WITH LOAD TRANSIENT CONTROL AND ASSOCIATED CONTROL METHOD

TECHNICAL FIELD

The present invention generally relates to multi-phase switching-mode power supply (SMPS), and more particularly but not exclusively relates to load transient control of multi-phase SMPS.

BACKGROUND

Multi-phase SMPS is used for providing high current in applications of, for example, microprocessors. FIG. 1 schematically shows a prior art multi-phase SMPS 100. The multi-phase SMPS 100 comprises N switching circuits P1-PN sharing a common input Vin and a common output Vout. The output Vout provides power supplied to a load. Each switching circuit, e.g. switching circuit P1 comprises a switch S1 and switching circuit P1 provides current to the load under the switching action of the corresponding switch S1. Switches S1 to SN are turned on sequentially by a plurality of control signals. However, during load up-transient, SMPS 100 can not offer enough current by sequentially turning on the switches anymore. Accordingly, a method of transient control in multi-phase SMPS is desired. It is further desired that the transient control can be adapted to the different levels of load transient.

SUMMARY

One embodiment of the present invention discloses a multi-phase SMPS. The multi-phase SMPS may comprise N switching circuits coupled to an output node, each switching circuit comprising a switch, wherein the multi-phase SMPS is configured to provide an output voltage at the output node for supplying a load, where N is a natural number. The multi-phase SMPS further comprises a plurality of comparing circuits and a controller. Wherein each comparing circuit may comprise a first input coupled to a threshold voltage, a second input coupled to a feedback signal of the output voltage and further comprise an output. The controller may have a plurality of inputs and N outputs, wherein each of the plurality of inputs is coupled to an output of a corresponding comparing circuit to receive the respective load indication signal, wherein each output of the controller is configured to provide a control signal that is coupled to a control end of a corresponding switch, and wherein the controller is configured to selectively turn on a plurality of the switches according to the load indication signals.

BRIEF DESCRIPTION OF THE DRAWINGS

Non-limiting and non-exhaustive embodiments are described with reference to the following drawings. The drawings are only for illustration purpose. Usually, the drawings only show part of the system or circuit of the embodiments.

Each of FIGS. 7A-7C illustrates a sequence of load indication signals and their corresponding indexes in a multi-phase SMPS, according to some embodiments of the present invention.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
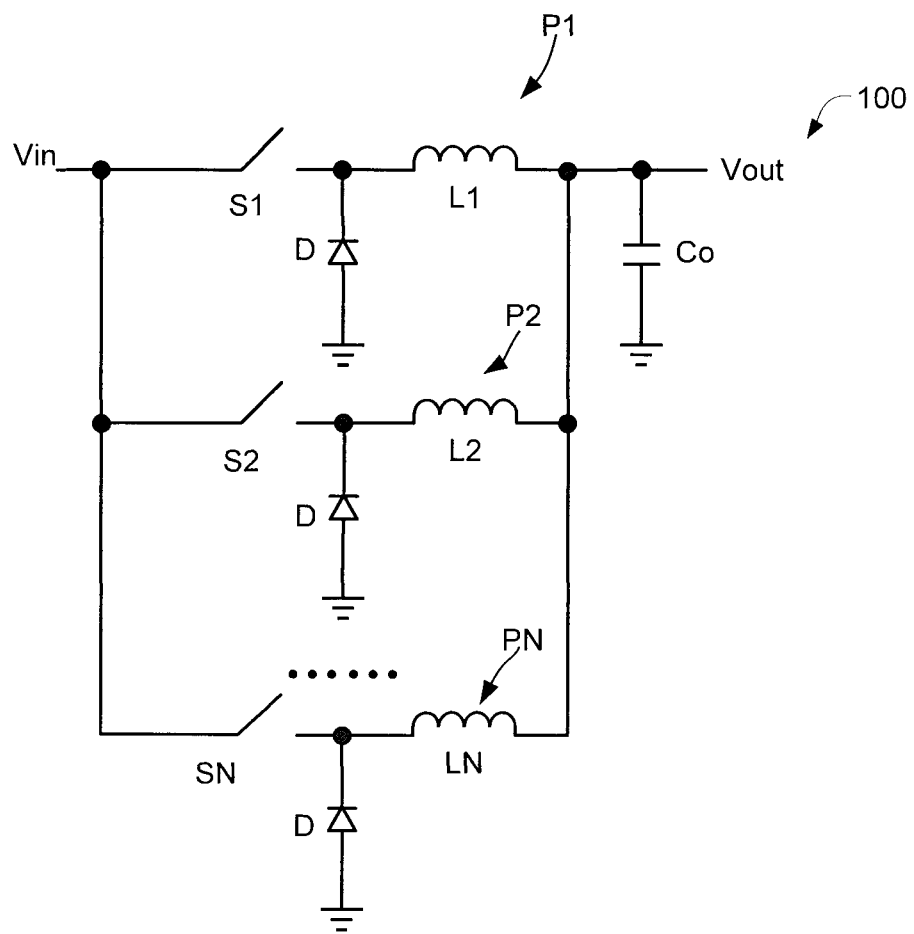
FIG. 1 shows a prior art multi-phase SMPS.
Figure 2A:
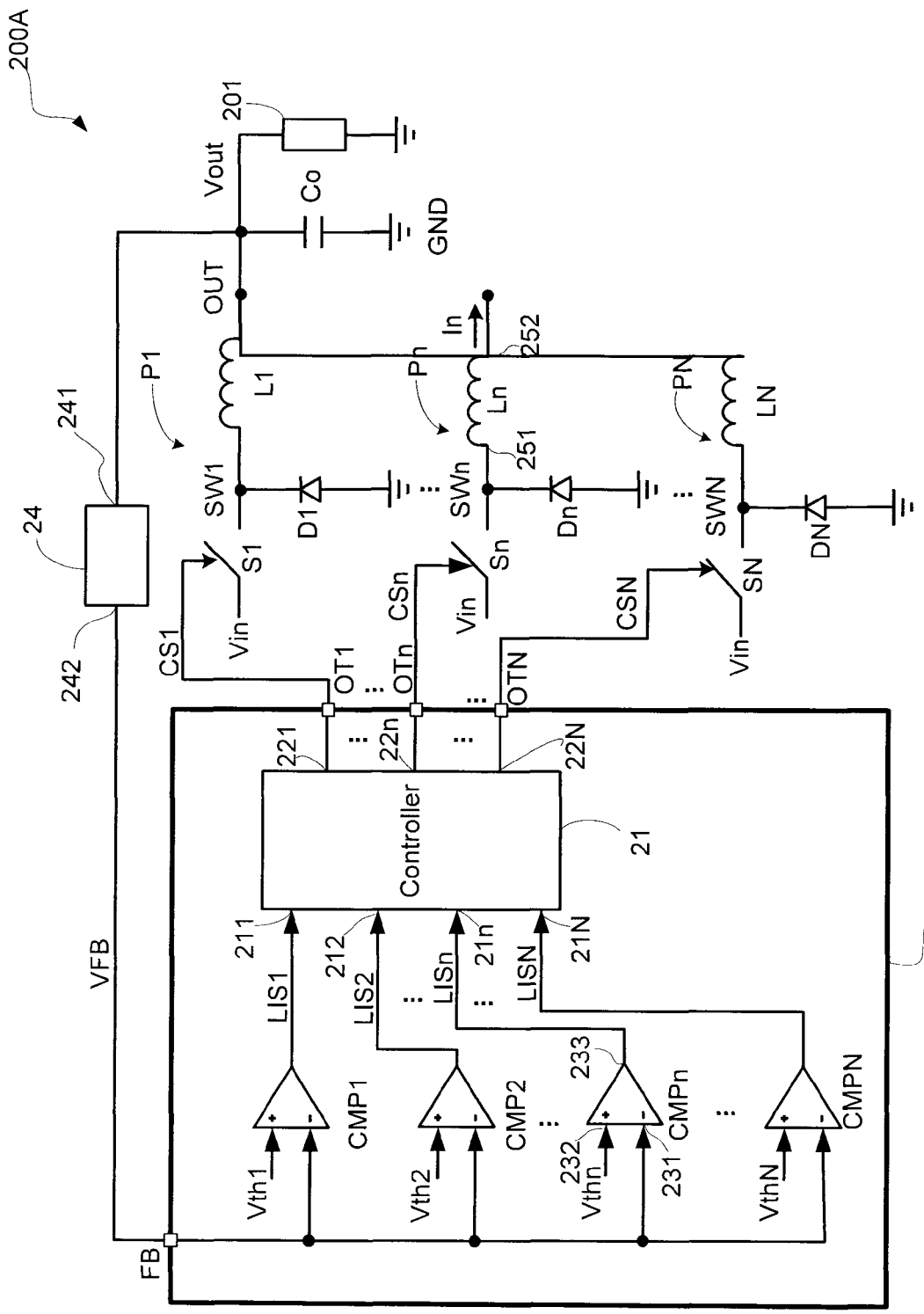
FIG. 2A schematically shows a multi-phase SMPS according to an embodiment of the present invention.

FIG. 2A shows a multi-phase SMPS 200A according to an embodiment of the present invention. Multi-phase SMPS 200A comprises N switching circuits P1, P2 . . . PN; N comparing circuits CMP1, CMP2 . . . CMPN; and a controller 21. The N switching circuits P1, P2 . . . PN are coupled to an output node OUT. Each switching circuit Pi comprises a switch Si coupled between an input voltage Vin and a switch node SWi, where i is a natural number from 1 to N (i=1, 2 . . . N). Each switching circuit, e.g. switching circuit Pn further comprises a rectifier Dn and an inductor Ln. Rectifier Dn is coupled between the corresponding switch Sn and a reference ground GND. Switch node SWn is a common node between switch Sn and the rectifier Dn. Inductor Ln has a first end 251 coupled to switch node SWn, and has a second end 252 coupled to the output node OUT. Multi-phase SMPS 200A further comprises an output capacitor Co coupled between the output node OUT and the reference ground GND. Through the alternating ON and OFF action of switches S1, S2 ... SN and the filtering of inductor Ln and output capacitor Co, input voltage Vin is converted into an output voltage Vout which is lower than input voltage Vin. And a current in each switching circuit, for example, In flows from switching circuit Pn to output node OUT. During normal operation, switches S1, S2 ... SN are turned on in sequence one by one. Multi-phase SMPS 200A provides an output voltage Vout at output node OUT to supply a load 201 and the output current flowing through load 201 are the summed currents from all the switching circuits P1, P2 ... PN. However, a plurality of switching circuits may be turned on simultaneously once load up-transient condition is detected where the output voltage Vout is lower than a predetermined reference voltage. Multi-phase SMPS 200A comprises a buck converter, however, in another embodiment, multi-phase SMPS may comprise a boost converter. And yet in another embodiment, multi-phase SMPS with buck-booster converter or converter with other topologies is also in the spirit of the present invention.

Multi-phase SMPS 200A may further comprise a feedback circuit 24 having an input 241 and an output 242. Input 241 is coupled to the output node OUT, and output 242 is configured to provide a feedback signal VFB. In one embodiment, the feedback signal VFB may be proportional to the output voltage Vout. In another embodiment, the feedback signal VFB may be a summation of a sensed output voltage and a slope compensation signal, for example, a saw-tooth waveform signal.

Each comparing circuit, e.g. CMPn comprises a first input 231, a second input 232 and an output 233. Where the first input 231 is coupled to feedback signal VFB, the second input 232 is coupled to a threshold voltage Vthn, and output 233 of comparing circuit CMPn is coupled to an input 21n of controller 21. That is, for a comparing circuit CMPi (i=1, 2 ... N), a first input is coupled to a same feedback signal VFB, a second input is coupled to a threshold voltage Vthi, and an output is configured to provide a load indication signal LISi that is coupled to controller 21.

In the shown embodiment, the first input 231 of comparing circuit CMPn is an inverting input terminal and the second input 232 is a non-inverting input. When feedback signal VFB is lower than threshold voltage Vthi, the corresponding load indication signal LISi is in logic HIGH, which indicates an active state. And when feedback signal VFB is higher than threshold voltage Vthi, the corresponding load indication signal LISi is in logic LOW which indicates an inactive state. In another embodiment, a threshold voltage is coupled to the inverting input of a comparing circuit and the feedback signal is coupled to the non-inverting input of the comparing circuit. And the active state of load indication signal LISi is presented by logic LOW and the inactive state of load indication signal LISi is presented by logic HIGH.

Controller 21 comprises N inputs 211, 212 ... 21N; and N outputs 221, 222 ... 22N. Where each input 21i (i=1, 2 ... N) is coupled to the output of the corresponding comparing circuit CMPi, configured to receive a corresponding load indication signal LISi. Each output 22i of controller 21 is configured to provide a control signal CSi coupled to a control end of the corresponding switch Si. For example, the output of comparing circuit CMPn is coupled to input 21n of controller 21, and the output 22n of controller 21 is coupled to the control end of switch Sn.

In the shown embodiment in FIG. 2A, a control circuit 20 comprises internally a plurality of comparing circuits CMP1, CMP2 ... CMPN and a controller 21. Control circuit 20 comprises externally a feedback terminal FB and a plurality of control signal output terminals OT1, OT2 ... OTN. Each of the plurality of comparing circuits, for example comparing circuit CMPn comprises a first input 231 coupled to feedback terminal FB, a second input 232 coupled to a threshold voltage Vthn, and an output 233 configured to provide a load indication signal LISn. Controller 21 comprises a plurality of inputs 211, 212 ... 21N coupled to the outputs of plurality of comparing circuits CMP1, CMP2 ... CMPN to receive the load indication signals LIS1, LIS2 ... LISN one to one. Controller 21 further comprises a plurality of outputs 221, 222 ... 22N coupled to the plurality of control signal output terminals OT1, OT2 ... OTN one to one. The plurality of control signal output terminals OT1, OT2 ... OTN is configured to provide a plurality of pulse width modulation (PWM) signals CS1, CS2 ... CSN. In the shown embodiment, Vth1>Vth2> ... VthN. When the feedback voltage at feedback terminal FB is lower than Vthn, n load indication signals LIS1, LIS2 ... LISn are in an active state, and n PWM signals will be set in logic HIGH to turn on n switches simultaneously.

Figure 2B:
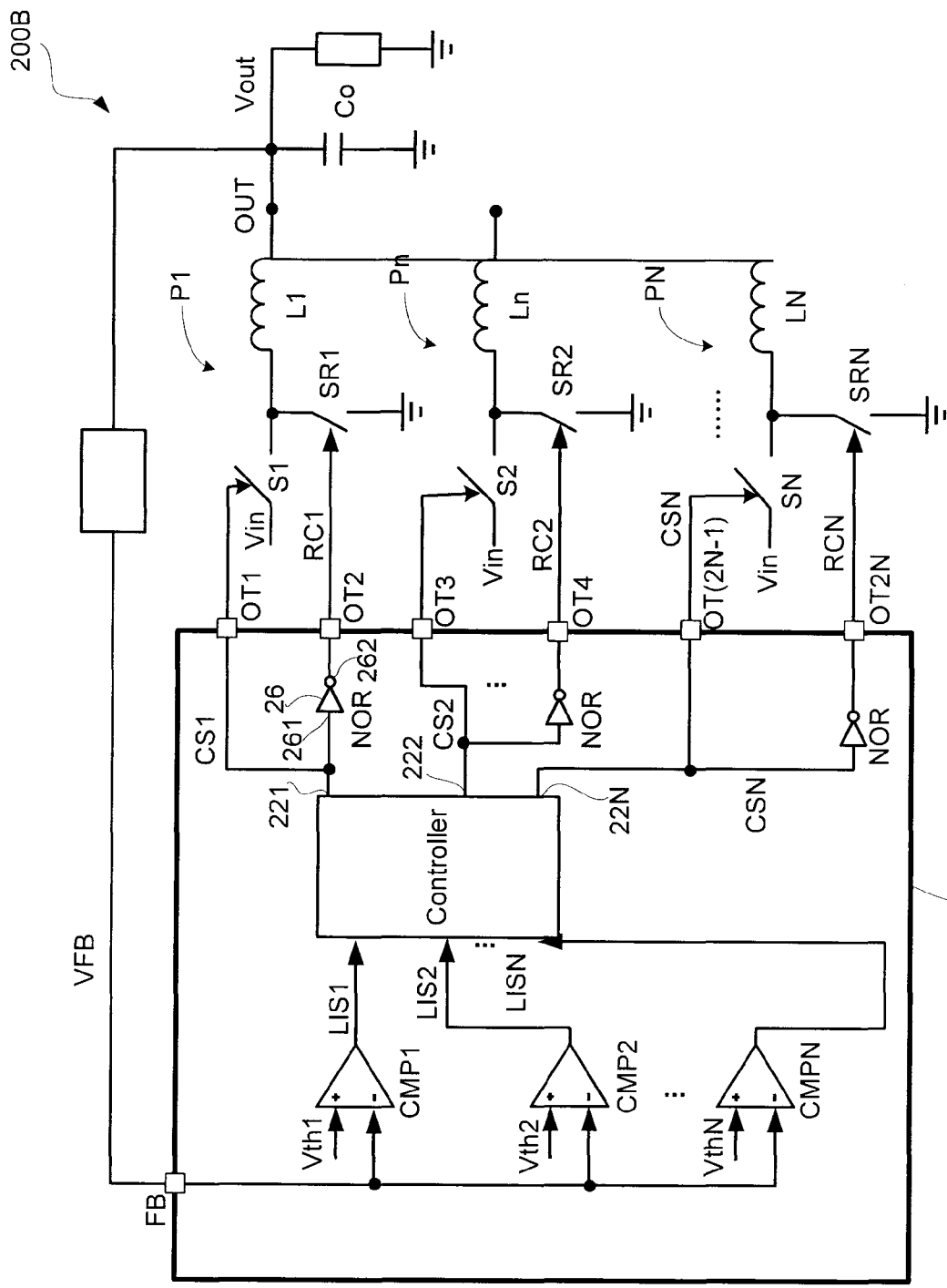
FIG. 2B schematically shows a multi-phase SMPS having synchronous rectifiers according to an embodiment of the present invention.

The rectifier Di (i=1, 2 ... N) is a diode in the embodiment in FIG. 2A. However, in other embodiment, the rectifier may be synchronous rectifier SRi (i=1, 2 ... N), referring to FIG. 2B. In the embodiment of FIG. 2B, each switching circuit, e.g. switching circuit P1 further comprises a NOR gate 26 having an input 261 and an output 262. Input 261 of NOR 26 is coupled to the corresponding control signal CS1. Output 262 of NOR gate 26 is coupled to the corresponding rectifier SR1.

Referring again to FIG. 2B, in this embodiment, compared with the control circuit 20 in FIG. 2A, control circuit 20B further comprises N NOR gates for switching circuits P1, P2 ... PN; and N rectification output terminals RC1, RC2 ... RCN. Taking rectification output terminal RC1 as an example, input 261 of NOR gate 26 is coupled to output 221 of controller 21, and output 262 of NOR gate 26 is coupled to a corresponding rectification output terminal RC1. Control circuit 20B controls the switching actions of switches S1, S2 ... SN, and synchronous rectifiers SR1, SR2 ... SRN. In one embodiment, for each switching circuit, e.g. switching circuit P1, switch S1 and rectifier SR1 are turned ON in a complementary fashion.

Figure 2C:
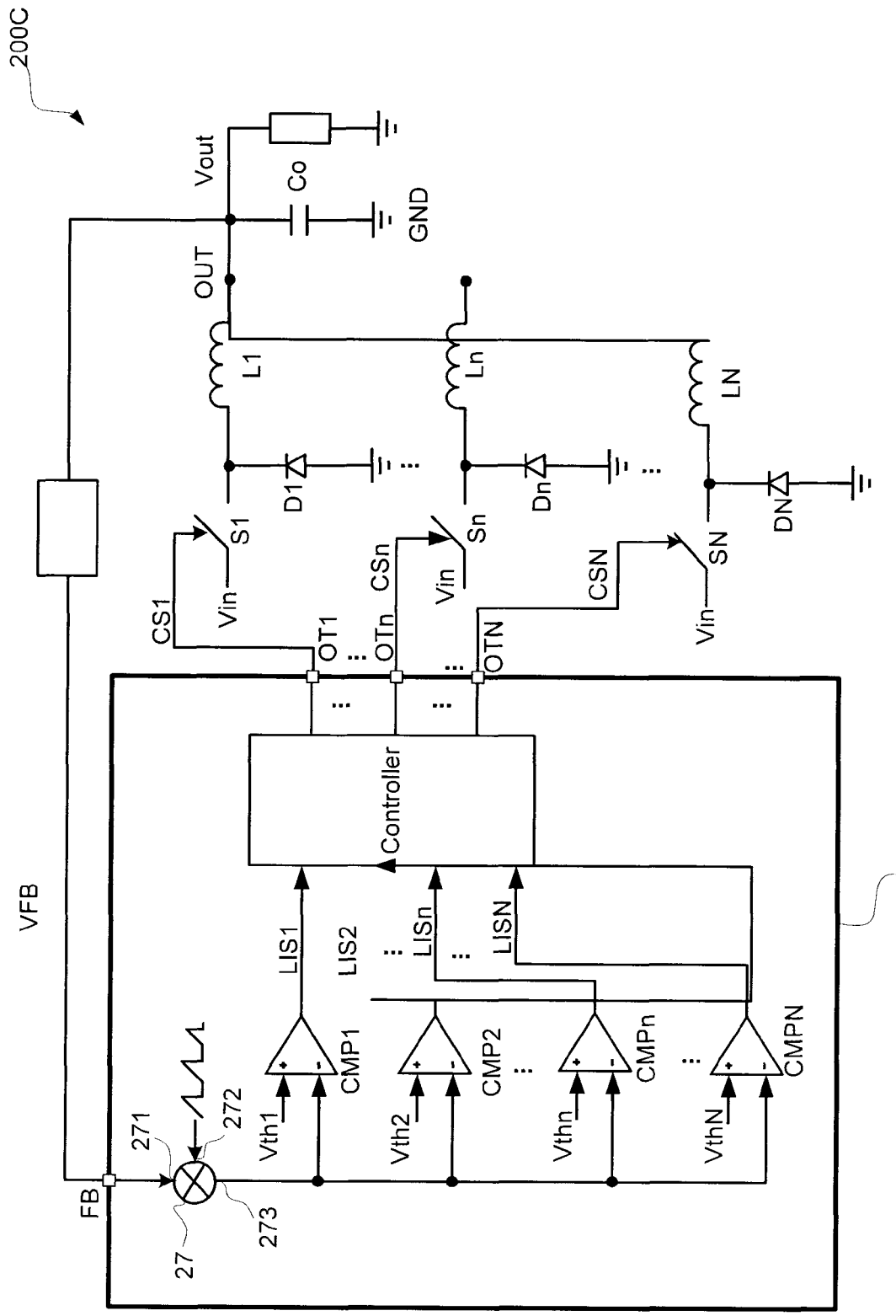
FIG. 2C schematically shows a multi-phase SMPS with external compensation according to an embodiment of the present invention.

In one embodiment, referring to FIG. 2C, multi-phase SMPS 200C and control circuit 20C may further comprise an adder 27, adding the feedback signal VFB and a slope compensation signal, for example, a saw-tooth signal for external compensation. Where adder 27 comprises a first input 271 receiving the feedback signal VFB, a second input 272 receiving a slope compensation signal and an output coupled to the inverting inputs of comparing circuits CMP1, CMP2 ... CMPN. Accordingly, threshold voltages Vth1, Vth2 ... VthN may be direct current (DC) signals.

In another embodiment, the inverting inputs of comparing circuits CMP1, CMP2 ... CMPN receive the feedback signal VFB, and threshold voltages Vth1, Vth2 ... VthN are saw-tooth waveform signals.

In one embodiment, multi-phase SMPS 200A or 200B may be a constant-on-time (COT) converter. A COT converter triggers a control signal CSi (i=1, 2 ... N) HIGH once a particular condition is detected. For example, once output voltage Vout is lower than the first threshold voltage Vth1, a control signal is held HIGH for a constant period of time or a period of time which is controlled by the input voltage Vin and the output voltage Vout.

Each load indication signal LISi may have a predetermined index IDi which is a natural number not higher than N. The term "index" is a number set for each load indication signal.

When the corresponding load indication signal is in active state, the index number is adopted to decide how many switches need to be turned on simultaneously for transient control. The indexes for the plurality of load indication signals are different from each other, and a load indication signal generated based on a lower threshold voltage corresponds to a higher index. When the highest index of the indexes of the load indication signals which are in active state is n, n switching circuits will be turned on simultaneously.

In the shown embodiment in FIG. 2A, the threshold voltages have a relationship of: $Vth1>Vth2> \ldots VthN$, and each load indication signal LISi has an index IDi equaling to its order i, which can be described as: $IDi=i$ ($i=1, 2 \ldots N$). Thus when n load indication signals (LIS1, LIS2 . . . LISn) are in active state, the highest index of load indication signals LIS1-LISn is n, and n PWM signals will be set in logic HIGH to turn on n switches simultaneously.

In one embodiment, a multi-phase SMPS having N switching circuits comprises less than N comparing circuits. And the index of each load indication signal may be not equal to its order. For example, a multi-phase SMPS having N switching circuits comprises f comparing circuits CMP1, CMP2 . . . CMPf, where f is a natural number less than N. The f comparing circuits compare f threshold voltages Vth1, Vth2, . . . Vthf with a feedback signal respectively and generate f load indication signals LIS1, LIS2 . . . LISf, where $Vth1>Vth2> \ldots Vthf$. A controller of the multi-phase SMPS comprises f inputs which are coupled to f load indication signals and comprises N outputs configured to provide N control signals CS1, CS2 . . . CSN. The index IDi for load indication signals LISi can be any natural number not higher than N ($i=1, 2 \ldots f$), if only the indexes meet the requirement of $ID1< ID2< \ldots <IDf$.

FIGS. 7A-7C show some examples for illustrating the various possibilities of the indexes of the load indication signals. Each figure of FIGS. 7A-7C illustrates a series of load indication signals and their corresponding indexes in a multi-phase SMPS which has 10 switching circuits.

FIG. 7A illustrates load indication signals LIS1-LIS6 and their indexes ID1-ID6 of a multi-phase SMPS having 10 switching circuits, according to an embodiment of the present invention. Load indication signal LISi is in active state when VFB is lower than Vthi ($i=1, 2, \ldots 6$), and where $Vth1>Vth2> \ldots >Vth6$. The indexes for signals LIS1, LIS2 . . . LIS6 are 1, 2, 4, 6, 8 and 10 respectively. That is to say, when only signals LIS1 and LIS2 are in active state, the highest index for LIS1 and LIS2 is 2, and 2 switches will be turned on simultaneously for transient control. When signals LIS1, LIS2, LIS3 and LIS4 are in active state, the highest index for LIS1-LIS4 is 6, and 6 switches will be turned on simultaneously for transient control. And when all the load indication signals LIS1, LIS2 . . . LIS6 are in active state, the highest index for LIS1-LIS6 is 10, and all the 10 switches in the 10 switching circuits will be turned on simultaneously.

FIG. 7B illustrates load indication signals LIS1-LIS6 and their indexes in a multi-phase SMPS having 10 switching circuits, according to another embodiment of the present invention. Compared with the embodiment in FIG. 7A, index ID6 is 8 in FIG. 7B, not 10. Thus when all the load indication signals LIS1, LIS2 . . . LIS6 are in active state, 8 switches may be turned on simultaneously for transient control.

FIG. 7C illustrates load indication signals LIS1-LIS4 and their indexes in a multi-phase SMPS having 10 switching circuits, according to yet another embodiment of the present invention. Compared with the embodiments in FIG. 7A and FIG. 7B, the multi-phase SMPS in FIG. 7C comprises less comparing circuits and generates only 4 load indication signals.

Figure 3A:
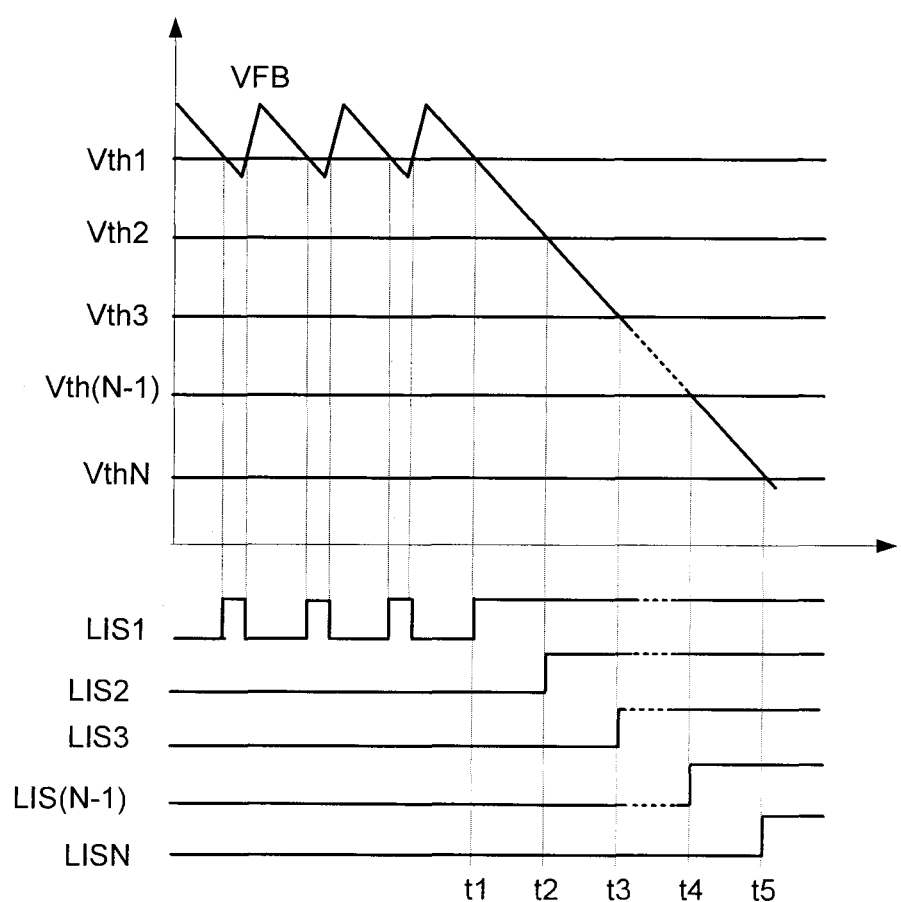
FIG. 3A illustrates waveforms of some signals in a multi-phase SMPS with external compensation according to an embodiment of the present invention.

FIG. 3A illustrates waveforms in the multi-phase SMPS shown in FIG. 2A with external compensation according to an embodiment of the present invention. In this embodiment, the signal coupled to the inverting input terminals of comparing circuits CMP1, CMP2 . . . CMPN are a summation of the feedback signal of the output voltage Vout and a saw-tooth signal. Threshold voltages Vth1, Vth2 . . . VthN decrease step by step where $Vth1>Vth2> \ldots VthN$. In one particular embodiment, threshold voltages Vth1, Vth2 . . . VthN decrease in arithmetical progression where: $Vth1-Vth2=Vth2-Vth3 \ldots =Vthn-Vth(n+1) \ldots =Vth(N-1)-VthN$. Feedback signal VFB of output voltage Vout is compared to a plurality of threshold voltages Vth1, Vth2 . . . VthN respectively. For example, comparing VFB with Vth1, a first load indication signal LIS1 is generated and comparing VFB with Vth2, a second load indication signal LIS2 is generated, and so on. Before time t1, during normal operation, signal LIS1 presents regular pulses (or square waveform) with relative high frequency. When load increases, VFB decreases and after time t1, VFB is smaller than Vth1 and signal LIS1 presents logic HIGH. After time t2, VFB is smaller than Vth2 and signal LIS2 presents logic HIGH. During normal operation before time t1, signal LIS1 presents pulses (or regular square waveform) and other load indication signals LIS2, LIS3 . . . LISN are in logic LOW. In the shown embodiment, inactive state is logic LOW. While during load up-transient, some of the load indication signals turn into active state. In the shown embodiment, the active state of a load indication signal LISi is logic HIGH. In another embodiment, the active state of load indication signal is logic LOW and inactive state of load indication signal is logic HIGH. Between time t2 and t3, load indication signals LIS1 and LIS2 are in logic HIGH. Between time t3 and t4, load indication signals LIS1, LIS2 and LIS3 are in logic HIGH. Between time t4 and t5, load indication signals LIS1, LIS2 . . . LIS(N−1) are in logic HIGH.

In the shown embodiment, a load indication signal LISi has an index of i ($i=1, 2 \ldots N$). For example, between time t2 and t3, load indication signals LIS1 and LIS2 are in active state, and the load indication signals in active state has a highest index of 2, and 2 control signals from CS1, CS2 . . . CSN will be set HIGH configured to turn on 2 switches simultaneously. By turning on 2 switches simultaneously, the current supplied to the load increases and the multi-phase SMPS is adapted to the load up-transient. Likewise, during time t4 and t5, N−1 load indication signals LIS1, LIS2 . . . LIS(N−1) are in active state, the load indication signals which are in active state has a highest index of N−1, and N−1 switches will be turned on simultaneously.

Figure 3B:
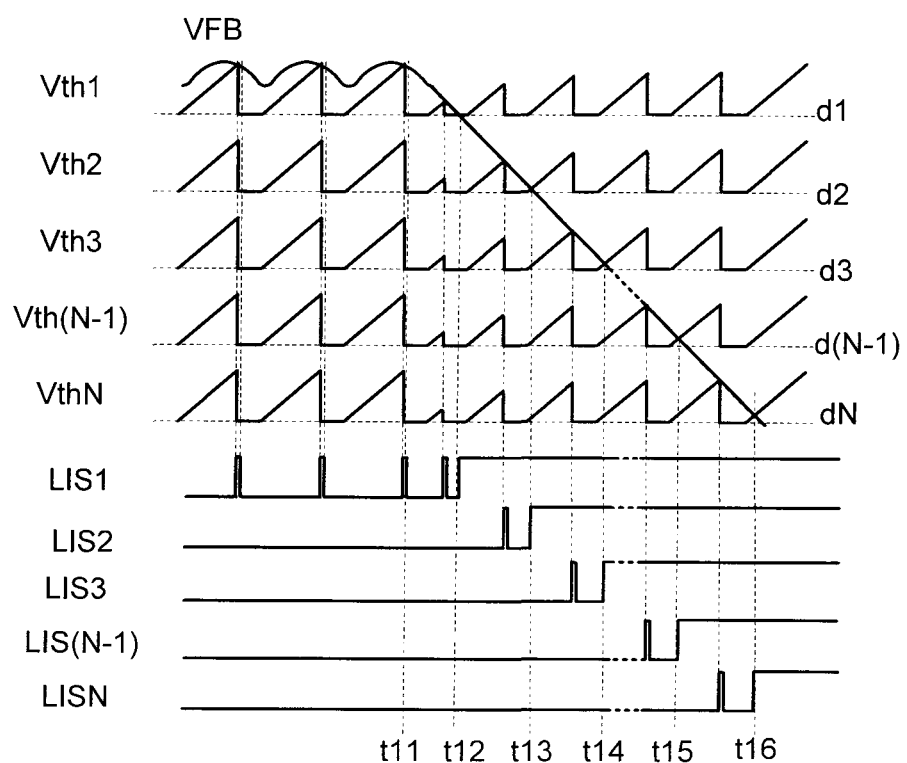
FIG. 3B illustrates waveforms of some signals in a multi-phase SMPS with internal compensation according to an embodiment of the present invention.

FIG. 3B illustrates waveforms in the multi-phase SMPS shown in FIG. 2A or FIG. 2B with internal compensation according to an embodiment of the present invention. In this embodiment, feedback signal VFB is a sensed voltage of the output voltage Vout. And in one embodiment, feedback signal VFB is approximately proportional to Vout, and each threshold voltage Vthi is a summation of a direct current signal and a saw-tooth signal. In one embodiment, the saw-tooth signal for the plurality of threshold voltages Vth1, Vth2 . . . VthN are approximately the same, and the DC signals d1, d2 . . . dN for the plurality of threshold voltages Vth1, Vth2 . . . VthN decrease step by step. And in one embodiment, DC signals d1, d2 . . . dN for the plurality of threshold voltages Vth1, Vth2 . . . VthN are in arithmetical progression.

Feedback signal VFB of output voltage Vout is compared to a plurality of threshold voltages Vth1, Vth2 ... VthN individually. For example, by comparing VFB with Vth1, a first load indication signal LIS1 is generated, and by comparing VFB with Vth2, a second load indication signal LIS2 is generated, and so on. Before time t11, when during normal operation, signal LIS1 presents regular pulses. When load increases, VFB decreases accordingly. And after time t12, VFB is smaller than Vth1 and signal LIS1 presents logic HIGH. After time t13, VFB is smaller than Vth2 and signal LIS2 presents logic HIGH. When VFB is smaller than Vthi, signal LISi presents logic HIGH (i=1, 2 ... N).

Continuing with FIG. 3B, when a threshold voltage Vthi (i=1, 2 ... N) is higher than feedback signal VFB, signal LISi is triggered HIGH. While during load up-transient, some of load indication signals turn into active state. In the shown embodiment, the active state of a load indication signal LISi is logic HIGH.

Between time t13 and t14, load indication signals LIS1 and LIS2 are in active state, and the highest index of the output of the comparing circuits in active state is 2. Thus 2 switches from S1, S2 ... SN will be turned on simultaneously. And so on. Between time t15 and t16, N−1 switches will be turned on simultaneously.

Figure 4A:
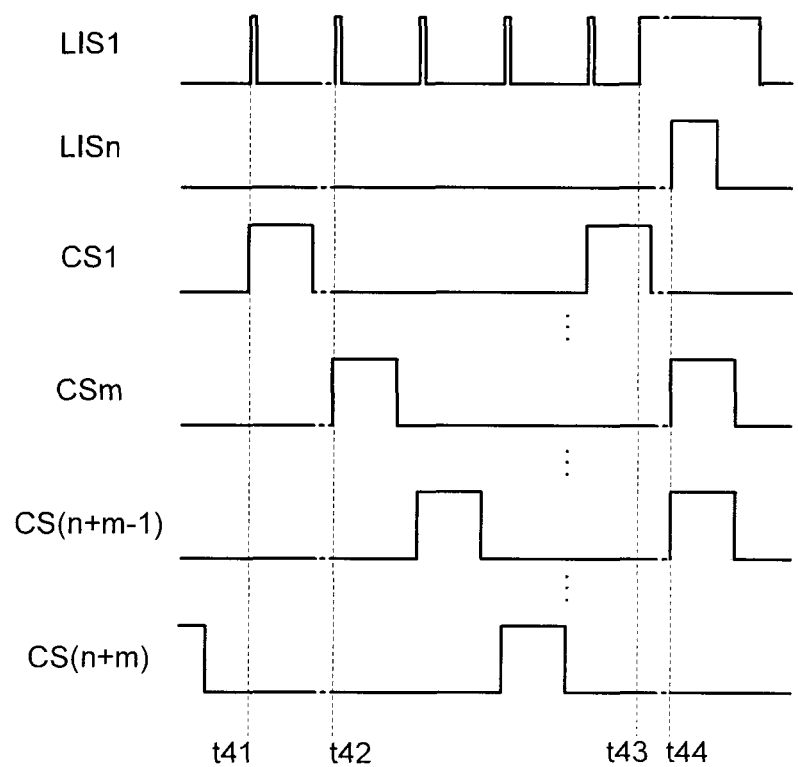
FIG. 4A illustrates some signals in a multi-phase SMPS in a first condition, the signals including a plurality of control signals during load transient, according to an embodiment of the present invention.

FIG. 4A illustrates the signals in a multi-phase SMPS as shown in FIG. 2A according to an embodiment of the present invention. In this embodiment, when load indication signals LIS1, LIS2 ... LISn are in active state, n control signals among signals CS1, CS2 ... CSN are set HIGH configured to turn on n switches simultaneously. Each switch Si has an order of i (i=1, 2 ... N) and in one embodiment, the orders of the n switches which are turned on are successive.

Referring to FIG. 4A, before time t43, the multi-phase SMPS works in normal operation, and the control signals CS1, CS2 ... CSN for the switches are turned on in sequence. In one embodiment, when the first load indication signal LIS1 or the output of the first comparing circuit CMP1 which is coupled to a highest threshold voltage Vth1 presents a pulse, the control signal CSm is set HIGH to turn on switch Sm for a period of time for COT control. During normal operation, switches S1-SN are turned ON under a predetermined sequence, each switch Si has a sequence number i (i=1, 2 ... N) and m represents the current sequence number at a time point. For example, at time t41, control signal CS1 is turned HIGH at the leading edge of the first pulse of the first load indication signal LIS1 under a predetermined switching sequence and the current sequence number is 1. At time t42, control signal CSm is turned HIGH at the leading edge of LIS1 and the current sequence number is m. And so on. The first load indication signal LIS1 can also be referred to as set signal of COT control. And the other load indication signals LIS2, LIS3 ... LISN are for overlapping control. Each load indication signal LISi has an index equal to its order i. When a load indication signal LISn is in active state and n is the highest index of the load indication signals which are in active state, n control signals are set HIGH to turn on n switches simultaneously.

Continuing with FIG. 4A. At time t44, m is again the current sequence number. At that time, load undergoes an up-transient, and n load indication signals LIS1, LIS2 ... LISn turn HIGH. Thus n control signals will be set HIGH to turn on n switches. The sequence numbers of the n switches which are turned on are successive. For example, in the shown embodiment in FIG. 4A, m+n−1 is not higher than the total number of switching circuits N. At time t43, m is the current sequence number, and n control signals CSm, CS(m+1) ... CS(n+m−1) are set HIGH simultaneously to turn on n switches from switch Sm to S(n+m−1). Where n can be any natural number not higher than N.

Figure 4B:
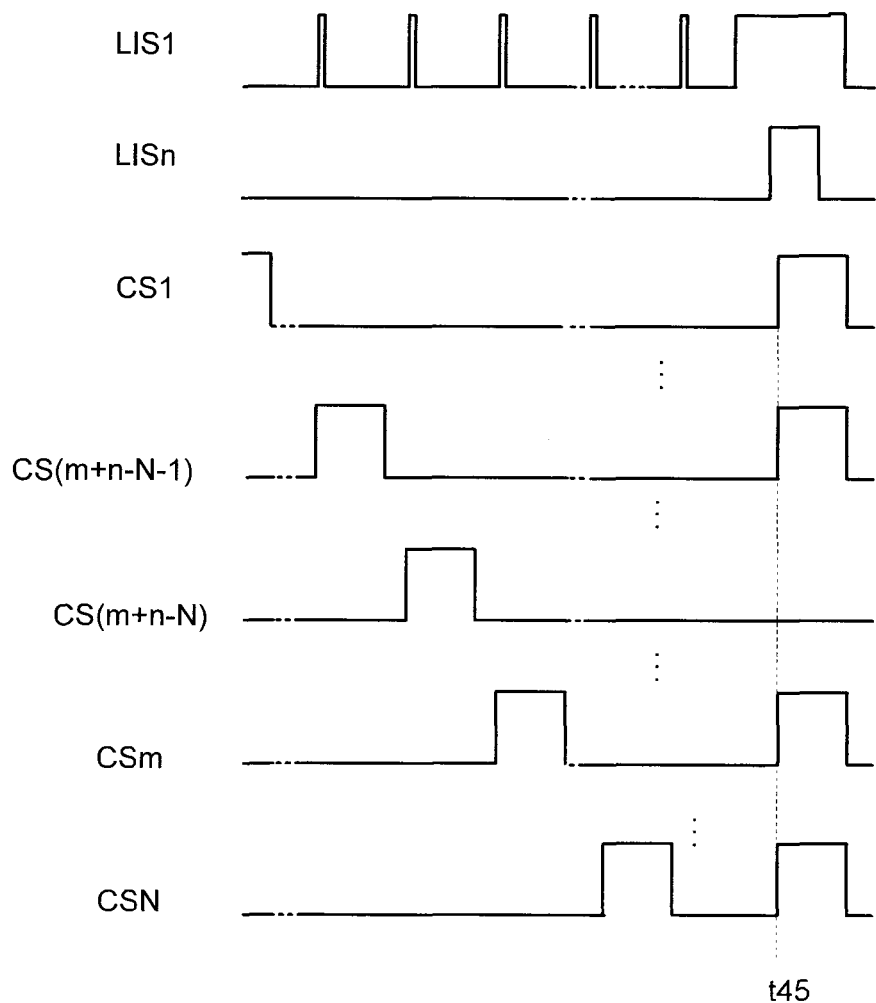
FIG. 4B illustrates some signals in a multi-phase SMPS in a second condition, the signals including a plurality of control signals during load transient, according to an embodiment of the present invention.

FIG. 4B illustrates the signals in the multi-phase SMPS as shown in FIG. 2A or FIG. 2B where m+n−1 is higher than N, according to an embodiment of the present invention. Each load indication signal LISi has an index equal to its order i. At time 45, signals LIS1, LIS2 ... LISn are in active state, m is the current sequence number and n is the highest index of the load indication signals LIS1, LIS2 ... LISn. The control signals counted from CSm to CSN and from CS1 to CS(m+n−N−1) are set HIGH simultaneously. Accordingly, the n switches from Sm to SN and from S1 to S(m+n−N−1) are turned on simultaneously.

The signals in FIG. 4A and FIG. 4B are for illustration only. The invention is intended to cover alternatives which are different from the signals as shown in FIGS. 4A and 4B without departing from the spirit of the invention as defined by the claims.

Figure 5:
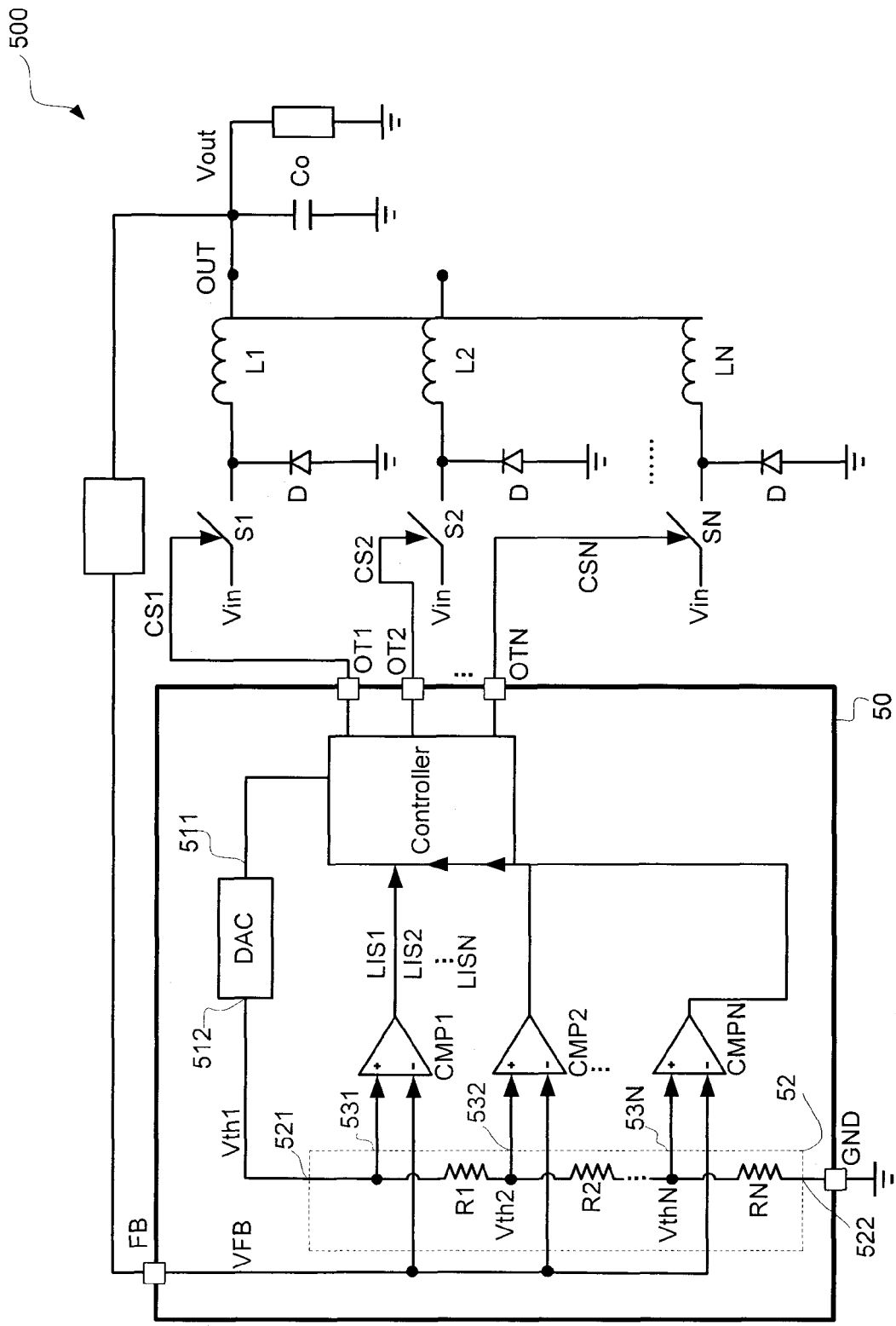
FIG. 5 illustrates a multi-phase SMPS with a digital to analog converter and a resistor divider, according to an embodiment of the present invention.

FIG. 5 illustrates a multi-phase SMPS 500 comprising a resistor divider 52, according to an embodiment of the present invention. Compared to the embodiment shown in FIG. 2A, control circuit 50 of SMPS 500 further comprises a digital to analog converter (DAC) 51 and a resistor divider 52. DAC 51 comprises an input 511 and an output 512. Input 511 of DAC 51 is coupled to controller 21. Controller 21 outputs a digital threshold signal to input 511 of DAC 51. Through the digital to analog converting, DAC 51 outputs an analog threshold signal Vth1. Resistor divider 52 comprises a plurality of resistors R1, R2 ... RN coupled in series. Resistor divider 52 comprises a first input 521 coupled to output 512 of DAC 51 to receive the threshold signal Vth1, a second input 522 coupled to a reference ground GND, and a plurality of outputs 531, 532 ... 53N coupled to a plurality of comparing circuits CMP1, CMP2 ... CMPN. For example, output 531 of resistor divider 52 is coupled to the non-inverting input of the first comparing circuit CMP1. Output 532 is coupled to the non-inverting input of the second comparing circuit CMP2. And so on. The first input 521 of resistor divider 52 is internally coupled to the first resistor R1. The second input 522 is internally coupled to the last resistor RN. The first output 531 of resistor divider 52 is directly coupled to the first input 521 of resistor divider 52. The second output 532 is internally coupled between the first resistor R1 and the second resistor R2. And the last output 53N of resistor divider 52 is internally coupled between resistor R(N−1) and resistor RN. The N outputs 531, 532 ... 53N provide N threshold voltages Vth1, Vth2 ... VthN for the N comparing circuits CMP1, CMP2 ... CMPN. In one embodiment, resistors R1, R2 ... RN have a same resistance value, and the N threshold voltages Vth1, Vth2 ... VthN decrease in arithmetical progression which can be featured as: Vth1−Vth2=Vth2−Vth3= ... =Vth(N−1)−VthN.

Figure 6:
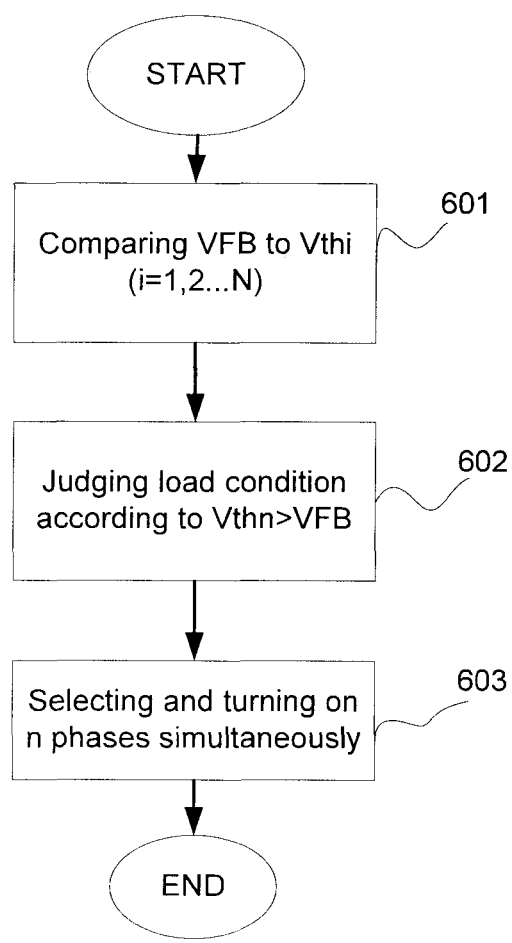
FIG. 6 illustrates a method of load transient control in a multi-phase SMPS, according to an embodiment of the present invention.

FIG. 6 illustrates a method of load transient control in a multi-phase SMPS, according to an embodiment of the present invention. The multi-phase SMPS having an input coupled to a plurality of switches and having an output configured to provide an output voltage. The method comprises in step 601, comparing a feedback signal of the output voltage to a plurality of threshold voltages. For a multi-phase SMPS comprising N switching circuits, N threshold voltages Vth1, Vth2 ... VthN are adopted. In one embodiment, threshold voltages decrease step by step, or in other words Vth1>Vth2> ... VthN.

Continuing with FIG. 6, in one embodiment, the feedback signal has a positive relationship with the output voltage. In one embodiment, the feedback signal VFB is proportional to the output voltage of multi-phase SMPS. The comparison between the feedback signal and the plurality of threshold voltages gets a plurality of load indication signals. When the load becomes heavy, the feedback signal VFB of output voltage decreases, and more load indication signals enters into an active state. Where the active state of a load indication signal represents that the feedback signal is lower than the corresponding threshold voltage. In step 602, the method further comprises judging the load condition according to the comparison results. For the multi-phase SMPS having N switching circuits, the load condition is judged by finding out the threshold voltages which are higher than the feedback signal VFB, or in other words, finding out the load indication signals which are in active state. Each load indication signal is set by an index, where the index is natural number not higher than N. The method further comprises finding out a highest index n of the load indication signals which are in active state. Where n is a natural number among 1 to N. And in step 603, the method further comprises selecting and turning on a plurality of switches simultaneously according to the load condition. For example, for the multi-phase SMPS having N switching circuits, when the highest index of the load indication signals which are in active state is n, n switches are turned on simultaneously. Each switch Si has a sequence number i (i=1, 2 . . . N), and in one embodiment, the sequence numbers of the n switches which are simultaneously turned on are successive. Referring to FIG. 4A, if m+n−1 is not higher than N, n switches from switch Sm to switch(m+n−1) are simultaneously turned on, where m represent the current sequence number under a predetermined switching sequence. And referring to FIG. 4B, if m+n−1 is higher than N, n switches from Sm to SN and from S1 to S(m+n−1−N) are simultaneously turned on.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:
1. A multi-phase SMPS, comprising:
N switching circuits coupled to an output node, each switching circuit comprising a switch, wherein the multi-phase SMPS is configured to provide an output voltage at the output node to supply a load, where N is a natural number;
a plurality of comparing circuits, each comparing circuit having a first input, a second input and an output, wherein the first input is coupled to a threshold voltage, wherein the second input is coupled to a same feedback signal of the output voltage and wherein the output is configured to provide a load indication signal; and
a controller, comprising a plurality of inputs and N outputs, wherein each of the plurality of inputs is coupled to an output of a corresponding comparing circuit to receive the respective load indication signal, wherein each of the N outputs is configured to provide a control signal that is coupled to a control end of a corresponding switch, and wherein the controller is configured to selectively turn on a plurality of switches simultaneously according to the load indication signals.
2. The multi-phase SMPS of claim 1, wherein each load indication signal has a predetermined index that is a natural number not higher than N, and one of the load indication signal is in an active state when the feedback signal is lower than the corresponding threshold voltage, and wherein the number of the plurality of switches equals a highest index of the load indication signals which are in the active state.
3. The multi-phase SMPS of claim 2, wherein the active state is logic HIGH.
4. The multi-phase SMPS of claim 1, wherein each switch Si has a sequence number i (1=1, 2 . . . N), and the sequence numbers of the plurality of switches are successive.
5. The multi-phase SMPS of claim 4, wherein the plurality of switches have n switches, and wherein:
when m+n−1 is not higher than N, n switches from Sm to S(m+n−1) are configured to be simultaneously turned on, where m represents the current sequence number; or
when m+n−1 is higher than N, n switches from Sm to SN and from S1 to S(m+n−N−1) are configured to be simultaneously turned on.
6. The multi-phase SMPS of claim 1, comprising N comparing circuits, wherein one of the load indication signal is in an active state when the feedback signal is lower than the corresponding threshold voltage, and wherein when n load indication signals are in the active state, n switches are configured to be turned on simultaneously.
7. The multi-phase SMPS of claim 1, further comprising N NOR gates, wherein:
each switching circuit further comprises a synchronous rectifier; and wherein
each NOR gate comprises an input and an output, wherein the input is coupled to a corresponding output of the controller, and the output is coupled to a corresponding synchronous rectifier.
8. The multi-phase SMPS of claim 1, wherein the plurality of comparing circuits comprises a first comparing circuit configured to receive a highest threshold voltage, and wherein when the first comparing circuit outputs a pulse, one of the switch is turned ON for a constant period of time.
9. The multi-phase SMPS of claim 1, wherein the threshold voltages coupled to the plurality of comparing circuits decrease in arithmetical progression.
10. The multi-phase SMPS of claim 1, further comprising an output capacitor, coupled between the output node and a reference ground, wherein each switching circuit further comprises:
a rectifier coupled between a corresponding switch and the reference ground; and
an inductor, having a first end coupled to the switch and the rectifier, and having a second end coupled to the output node.
11. The multi-phase SMPS of claim 1, further comprising an adder, wherein the adder comprises a first input configured to receive the feedback signal, a second input configured to receive a slope compensation signal, and an output coupled to the second inputs of the plurality of comparing circuits.
12. The multi-phase SMPS of claim 1, further comprising:
a digital to analog converter (DAC), comprising an input and an output, wherein the input of the DAC is coupled to the controller; and
a resistor divider, comprising a plurality of resistors coupled in series, the resistor divider comprising a first input coupled to a first resistor, a second input coupled to a last resistor and a plurality of outputs, wherein the first input is coupled to the output of the DAC, wherein the second input is coupled to a reference ground, and wherein the plurality of outputs are configured to provide the threshold voltages.
13. The multi-phase SMPS of claim 1, further comprising a feedback circuit having an input and an output, wherein the input is coupled to the output node, and wherein the output is configured to provide the feedback signal.

14. A control circuit, comprising:
- a feedback terminal configured to receive a feedback signal;
- a plurality of control signal output terminals;
- a plurality of comparing circuits, wherein each of the plurality of comparing circuits having a first input coupled to the feedback terminal, a second input coupled to a threshold voltage, and an output configured to provide a load indication signal; and
- a controller, comprising a plurality of inputs and a plurality of outputs, wherein each of the plurality of inputs is coupled to the output of the respective comparing circuit, each of the plurality of outputs is coupled to the respective control signal output terminal configured to provide a pulse width modulation (PWM) signal, and wherein the controller is configured to selectively set a plurality of the PWM signals in HIGH state according to the load indication signals.

15. The control circuit of claim 14, wherein one of said load indication signal is in an active state when the feedback signal is lower than the corresponding threshold voltage, and wherein when n load indication signals are in the active state, n PWM signals are set in HIGH state simultaneously.

16. The control circuit of claim 14, further comprising:
- a DAC, comprising an input and an output, wherein the input of the DAC is coupled to the controller; and
- a resistor divider, comprising a plurality of resistors coupled in series, the resistor divider comprising a first input internally coupled to a first resistor, a second input internally coupled to a last resistor and a plurality of outputs, wherein each of the plurality of outputs is internally coupled to a corresponding resistor, and wherein the first input of the resistor divider is coupled to the output of the DAC, wherein the second input of the resistor divider is coupled to a reference ground, and wherein the plurality of outputs of the resistor divider are configured to provide the threshold voltages.

17. The control circuit of claim 14, further comprising a plurality of NOR gates and a plurality of rectification output terminals, wherein each NOR gate has an input coupled to a corresponding output of the controller, and wherein each NOR gate has an output coupled to a corresponding rectification output terminal.

18. A method of load transient control in a multi-phase SMPS, the multi-phase SMPS having an input coupled to a plurality of switches and having an output configured to provide an output voltage, wherein the SMPS comprises N switching circuits, the method comprising:
- comparing a feedback signal of the output voltage to a plurality of threshold voltages;
- judging the load condition of the multi-phase SMPS according to the comparison results, the comparison results obtained by:
  - obtaining a plurality of load indication signals by comparing the feedback signal with a plurality of threshold voltages $Vth1, Vth2 \ldots Vthf$, wherein $Vth1 > Vth2 > \ldots Vthf$, and where f is a natural number from 2 to N;
  - setting an index for each load indication signal, wherein the index is a natural number not higher than N, and wherein a load indication signal is in active state if the feedback signal is lower than a corresponding threshold voltage;
  - finding a highest index of the load indication signals which are in active state; and
- simultaneously turning on the plurality of switches, wherein the number of the plurality of switches equals the highest index.

19. The method of claim 18, wherein each switch $Si$ has a sequence number i ($i=1, 2 \ldots N$), and the sequence numbers of the plurality of switches are successive, and wherein when the plurality of switches have n switches:
- if $m+n-1$ is not higher than N, simultaneously turning on switches from $Sm$ to $S(m+n-1)$, where m represents the current sequence number; or
- if $m+n-1$ is higher than N, simultaneously turning on switches from $Sm$ to $SN$ and from $S1$ to $S(m+n-1-N)$.

* * * * *